United States Patent [19]

Scanlon

[11] Patent Number: 4,700,619
[45] Date of Patent: Oct. 20, 1987

[54] REMOVABLE COOKING SURFACE FOR THE MOVABLE PLATEN OF A TWO-SIDED COOKING DEVICE

[75] Inventor: John M. Scanlon, Louisville, Ky.

[73] Assignee: Vulcan-Hart Corporation, Louisville, Ky.

[21] Appl. No.: 925,282

[22] Filed: Oct. 30, 1986

[51] Int. Cl.$^4$ ............................................. A47J 37/06
[52] U.S. Cl. ...................................... 99/349; 99/374; 99/379; 99/422
[58] Field of Search ................. 99/422, 349, 372, 377, 99/379; 219/524, 525

[56] References Cited

U.S. PATENT DOCUMENTS

| | | |
|---|---|---|
| 3,465,627 | 9/1969 | Vigneault . |
| 3,746,837 | 7/1973 | Frey et al. ........................ 99/349 X |
| 4,150,609 | 4/1979 | McClean ............................... 99/372 |
| 4,165,682 | 8/1979 | Weiss . |
| 4,217,817 | 8/1980 | Meamber . |
| 4,320,699 | 3/1982 | Binks . |
| 4,483,239 | 11/1984 | Mueller et al. . |
| 4,503,759 | 3/1985 | Haas, Sr. et al. . |
| 4,601,237 | 7/1986 | Harter et al. . |
| 4,635,538 | 1/1987 | Polster .................................. 99/349 |

FOREIGN PATENT DOCUMENTS

| | | | |
|---|---|---|---|
| 2504491 | 9/1975 | Fed. Rep. of Germany ........ 99/372 |
| 1370743 | 7/1964 | France ................................... 99/422 |
| 57-95451 | 6/1982 | Japan ..................................... 9/372 |

Primary Examiner—James Kee Chi
Attorney, Agent, or Firm—Laubscher & Laubscher

[57] ABSTRACT

An improved removable cooking surface assembly for the upper movable heated platen of a two-sided cooking device is disclosed. The assembly includes a planar rigid heat conducting metal plate which is coated on its lower surface with a layer of non-stick synthetic plastic material. The coated platen is removably connected with the heated platen and extends in contiguous relation across the lower surface thereof for uniform heat transfer from the platen to the food product being cooked. Following cooking of the product when upper platen is raised, the food product remains on the lower grill surface since the coating of the upper surface prevents the product from sticking thereto. After extended use, the cooking surface assembly is easily removed from the upper movable platen for refurbishing or replacement.

9 Claims, 3 Drawing Figures

REMOVABLE COOKING SURFACE FOR THE MOVABLE PLATEN OF A TWO-SIDED COOKING DEVICE

BACKGROUND OF THE INVENTION

In the fast food industry, two-sided cooking grills are used to reduce the cooking times of hamburgers and the like, while providing uniform cooking to given specifications. Typically, two-sided cooking grills include a lower fixed grill and an upper heated platen pivotally connected with the lower grill between open and closed positions. When the movable platen is in the closed position, it is normally parallel to the fixed surface and in contact with the upper surface of the food product on the grill, whereby the product is cooked from both sides. The present invention relates to an improved removable cooking surface assembly for the upper movable platen.

BRIEF DESCRIPTION OF THE PRIOR ART

Two-sided cooking devices are well-known in the patented prior art as evidenced by the patents to Mueller et al U.S. Pat. No. 4,483,239 and Harter et al U.S. Pat. No. 4,601,237. The Mueller et al patent discloses an adaptor for converting a conventional grill to a two-sided cooking grill. The adaptor includes a plate and a thin flexible skirt or film formed of non-stick material which covers the bottom cooking surface of the platen and which is removably connected with the adaptor by a retainer ring. A primary drawback of the Mueller et al device is that the non-stick film does not provide a uniform transfer of heat from the surface of the heated plate to the food product. This is due to the fact that the film sags away from the central portion of the plate surface since the film is only retained at its edges about the side portion of the plate. With insufficient heat transfer, the food product is not properly seared which is normally required in fast food cooking. In order to overcome this drawback, it would be necessary to securely fasten the film across the entire surface area of the plate, such as through adhesive or the like, which would defeat the purpose of the film as the whole platen would have to be removed to periodically refurbish the cooling surface. Alternatively, the temperature of the upper plate could be raised by 100° F. or more to provide a proper sear through the film. However, this would require excessive energy waste and would heat up the surrounding kitchen to an undesirable temperature.

The Harter et al patent, which is assigned to the assignee of the present invention, discloses an adjustable meat press for two-sided cooking. The upper movable platen of the meat press is coated with a layer of non-stick coating material to prevent the food product being cooked from sticking to the platen during cooking. After extended use, however, it is necessary to refurbish the non-stick coating on the movable platen. This requires removal and or replacement of the entire movable platen, resulting in excessive downtime for the grill, as well as excessive cost.

The present invention was developed in order to overcome these and other drawbacks of the prior devices by providing a non-stick cooking surface assembly for the upper movable platen of a two-sided cooking device which is characterized by uniform heat transfer to a food product being cooked as well as easy removal and replacement relative to the movable platen with minimal downtime.

SUMMARY OF THE INVENTION

Accordingly, it is a primary object of the present invention to provide a cooking surface assembly for the upper movable heated platen of a two-sided cooking device including a planar plate formed of a rigid heat-conducting material which has a thickness less than the thickness of the platen. A layer of synthetic plastic material which resists adhesion of a food product being cooked is connected with the lower surface of the platen. A plurality of bolts removably connect the coated plate with the platen in contiguous relation with the lower surface of the platen for uniform heat transfer from the platen to the layer of synthetic plastic material via the rigid plate. The layer of synthetic plastic on the cooking surface of the plate prevents food products such as hamburgers from sticking to the platen when the platen is raised following cooking.

According to a further object of the invention, the plate and layer of synthetic plastic contain aligned beveled openings for receiving the connecting bolts, each of which has a tapered head, whereby the bolt heads are flush mounted relative to the layer of synthetic plastic material.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
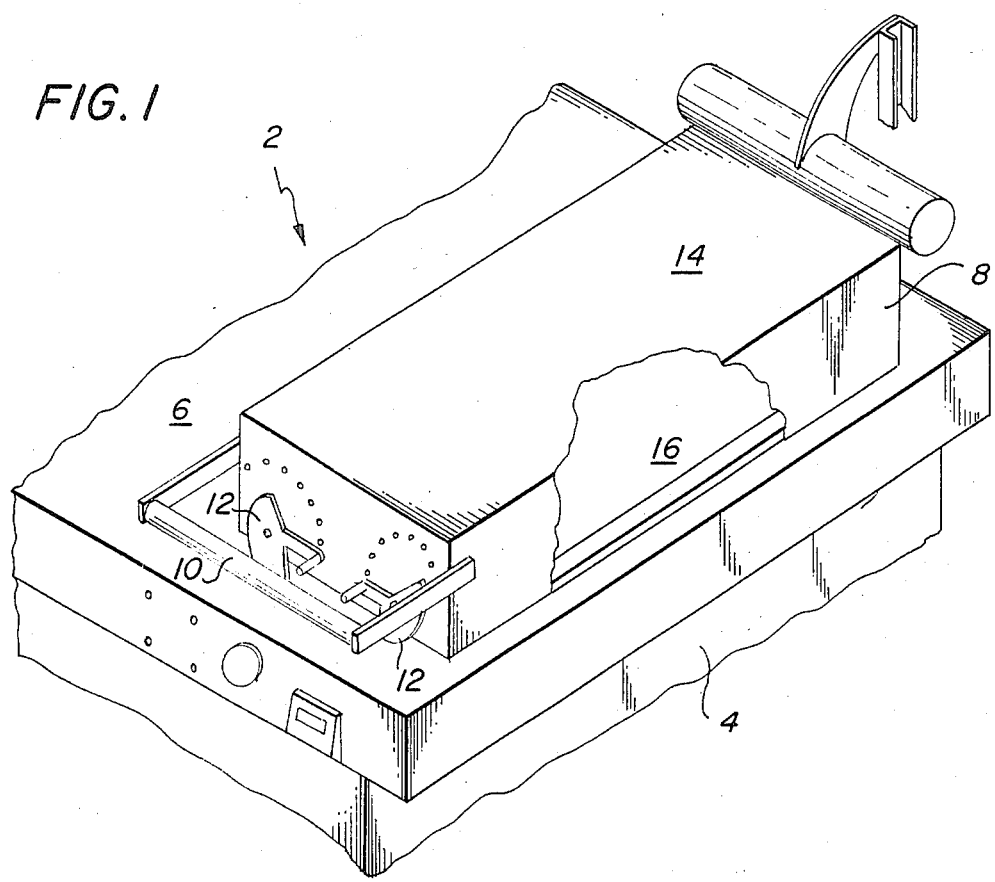
FIG. 1 is a partial perspective view of a two-sided cooking device including an upper movable heated platen having a removable cooking surface connected therewith.

A two-sided cooking device 2 is shown in FIG. 1. The device includes a lower fixed grill 4 having a planar horizontal lower cooking surface 6, and an upper movable heated cooking device 8 pivotally connected with the fixed grill for movement between an open position wherein the upper device is spaced from the lower cooking surface 6 and a closed position wherein the upper device is arranged parallel to and spaced from the lower cooking surface, whereby a food product arranged on the grill beneath the upper movable device is simultaneously cooked from both sides. A handle 10 is provided for raising and lowering the upper cooking device and adjustable cams 12 at the front and rear of the upper device are provided to control the spacing between the upper and lower cooking surfaces as disclosed in the Harter et al U.S. Pat. No. 4,601,237, which is incorporated herein by reference.

The lower grill is heated in a conventional manner by gas or electric burners (not shown) arranged beneath the lower cooking surface 6. Similarly, the upper cooking device is also heated, generally by an electrical coil or the like (not shown). More particularly, the upper cooking device includes a housing 14, the lower portion of which is defined by a platen 16. The platen, which is usually formed of a heat conducting metal, has the electrical coil embedded therein, whereby the entire lower surface area is heated uniformly to a desired temperature which is set by control devices at the front of the grill.

Figure 2:
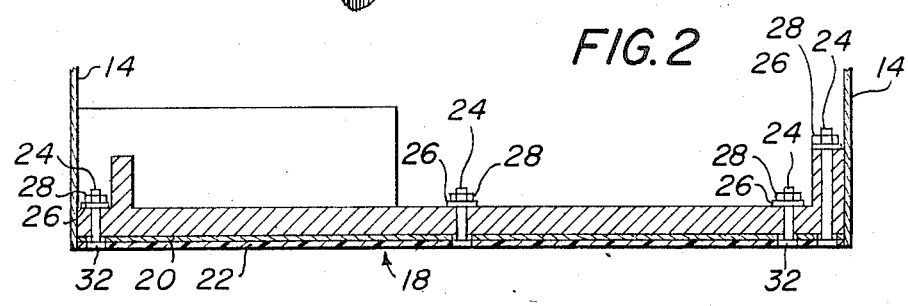
FIG. 2 is a partial side sectional view of the platen of FIG. 1.

The non-stick cooking surface assembly 18 is removably connected with the platen 16 of the upper cooking device as shown in FIGS. 1 and 2. The assembly includes a rigid planar plate 20 formed of a heat conducting metal such as aluminum. The plate has a rectangular vertical cross-sectional configuration and a peripheral configuration corresponding with that of the platen 16. A thin layer 22 of non-stick synthetic plastic material such as polytetrafluoroethylene is applied to the lower surface of the plate 20 as a coating. A suitable adhesive is used to secure the layer of synthetic plastic material to the plate.

Figure 3:
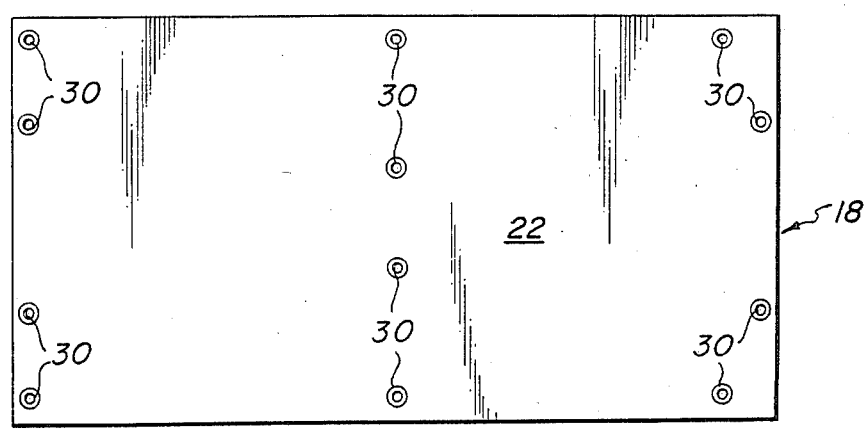
FIG. 3 is a bottom plan view of the removable cooking surface according to the invention.

The upper platen 16, the plate 20, and the layer of synthetic plastic material 22 contain aligned openings for receiving bolts 24 which are used to rigidly connect the cooking surface assembly with the upper cooking device. Lock washers 26 and nuts 28 are connected with the threaded ends of the bolts, respectively, to securely retain the cooking surface assembly. As shown in FIGS. 2 and 3, the openings 30 in the assembly 18 are beveled and the heads 32 of the bolts 24 are tapered to conform with the beveled openings, whereby the heads of the bolts are flush with the lower surface of the layer of synthetic plastic material.

It is readily apparent that the cooking surface assembly 18 may easily be removed from the platen by disconnecting the nuts and bolts. Thus after extended use, the cooking surface is removed from the platen and a new or refurbished assembly is installed in its place. The original assembly may then be refurbished for further use. The downtime required for replacement of the cooking surface assembly should generally be no longer than thirty minutes. Furthermore, the costs for refinishing the cooking surface are minimal requiring only re-coating of the surface with a layer of the non-stick synthetic plastic material.

Once connected with the platen of an upper cooking device, the removable cooking surface assembly provides excellent uniform heat transfer from the heated platen to the food product being cooked to sear the food product. The high heat transfer results from the fact that the entire upper surface of the plate 20 is in contiguous relation with the lower heated surface of the platen. Furthermore, the thickness of the plate is significantly less than that of the platen, affording sufficient heat conductivity which minimizes the weight and cost of the removable assembly. Typically, the heated platen 16 of the upper cooking device has a thickness of 0.250 inches. The thickness of the plate 20 of the removable cooking surface assembly is between 0.160 and 0.250 inches and preferably between 0.190 and 0.200 inches. The layer of synthetic plastic material preferably comprises a thin coating having a thickness of between 0.001 and 0.003 inches.

The removable cooking surface assembly according to the present invention incorporates a number of features advantageous over prior non-stick platens. The attaching bolts with tapered heads are designed to minimize particle accumulation under the heads as well as to permit turning the nut in disassembly without holding the bolt head. The coated plate of the assembly is disposable or may be reclaimed if desired. Its cost is low enough to make replacement feasible when required. The life of the upper cooking device is extended since the entire device need not be disassembled and shipped from the user's place of business to a repair facility for recoating. Moreover, as new and longer life non-stick coatings are developed, they can easily be substituted on the upper cooking device by replacing cooking surface assemblies. Finally, spare assemblies may be stored by the user at his facility since they are of significantly lesser cost than entire upper cooking devices.

While in accordance with the provisions of the Patent Statute the preferred forms and embodiments have been illustrated and described, it will be apparent to those skilled in the art that various changes and modifications may be made without deviating from the inventive concepts set forth above.

What is claimed is:

1. An improved cooking surface assembly for the upper movable heated platen of a two-sided cooking device, comprising
    (a) a planar plate having a generally rectangular vertical cross-sectional configuration, said plate being formed of a rigid heat conducting material and having a thickness less than the thickness of the platen;
    (b) a layer of synthetic plastic material connected with the lower surface of said plate, said material resisting adhesion of a food product being cooked by the two-sided cooking device; and
    (c) means for removably connecting said plate with the platen, said plate extending continuously over and in contiguous relation with the lower surface of the platen while being rigidly and securely affixed thereto to afford uniform maximum heat transfer from the heated platen to the cooking surface of the synthetic plastic material via the rigid plate, whereby when the movable platen is lowered to a position parallel to and spaced from a fixed grill of the cooking device with a food product being arranged between the platen and the grill, heat from the platen will be uniformly transmitted through said plate and said layer to assist in cooking the food product and when the upper platen is lifted away from a lower grill surface following cooking of the food product, said layer of synthetic plastic material prevents the ood product from adhering thereto.

2. Apparatus as defined in claim 1, wherein said plate and said layer contain a plurality of aligned through-openings, and further wherein said connecting means comprise threaded bolts which pass through said openings for connecting said plate with the platen, whereby said plate is easily removed from the platen for cleaning and replacement following extended use.

3. Apparatus as defined in claim 2, wherein said openings are defined by beveled surfaces, and further wherein said bolts have tapered heads corresponding with said beveled surfaces, respectively, whereby said bolt heads are flush-mounted relative to the layer of synthetic plastic material.

4. Apparatus as defined in claim 3, wherein said layer of synthetic plastic material comprises polytetrafluoroethylene.

5. Apparatus as defined in claim 4, wherein said plate is formed of metal.

6. Apparatus as defined in claim 5, wherein said metal comprises aluminum.

7. Apparatus as defined in claim 6, wherein said plate has a thickness of between 0.160 and 0.25 inches.

8. Apparatus as defined in claim 7, wherein said plate has a thickness of between 0.190 and 0.200 inches.

9. Apparatus as defined in claim 7, wherein said layer of polytetrafluoroethylene material has a thickness of between 0.001 and 0.003 inches.

* * * * *